US006445281B1

(12) United States Patent
Monnier

(10) Patent No.: US 6,445,281 B1
(45) Date of Patent: Sep. 3, 2002

(54) DYNAMICALLY CONTROLLED ELECTRONIC LOCKING SYSTEM AND CONTROL SYSTEM FITTED WITH SUCH A LOCKING SYSTEM

(75) Inventor: Jean-Luc Monnier, La Chaux-de-Fonds (CH)

(73) Assignee: MR Electronic S.A., La Chaux-de-Fonds (CH)

( * ) Notice: Subject to any disclaimer, the term of this patent is extended or adjusted under 35 U.S.C. 154(b) by 0 days.

(21) Appl. No.: 09/392,491

(22) Filed: Sep. 9, 1999

(30) Foreign Application Priority Data

Sep. 10, 1998 (FR) ........................................ 98 11397

(51) Int. Cl.[7] ............................................ G06F 7/04

(52) U.S. Cl. ........................ 340/5.1; 340/5.2; 340/5.7; 340/542; 70/263; 235/382

(58) Field of Search ........................ 340/5.1, 5.2, 5.7, 340/542, 543; 70/262–264; 235/382

(56) References Cited

U.S. PATENT DOCUMENTS

| | | | | | |
|---|---|---|---|---|---|
| 4,038,637 | A | * | 7/1977 | Peters | 340/5.1 |
| 4,455,588 | A | * | 6/1984 | Mochida et al. | 70/278 |
| 5,488,660 | A | * | 1/1996 | Dawson et al. | 70/278 |

* cited by examiner

*Primary Examiner*—Donnie L. Crosland
(74) *Attorney, Agent, or Firm*—Baker Botts L.L.P.

(57) ABSTRACT

The invention relates to a dynamically controlled electronic locking system. The locking system includes apparatus (10) for entering data into the locking system, an electronic data processing circuit (12) and a locking and unlocking control system (14). The locking system electronics include, in a particularly advantageous manner, linear feed shift registers for processing the values allowing access to be assured to a protected space. Application to protection systems for confined spaces to which access has to be controlled.

11 Claims, 4 Drawing Sheets

DYNAMICALLY CONTROLLED ELECTRONIC LOCKING SYSTEM AND CONTROL SYSTEM FITTED WITH SUCH A LOCKING SYSTEM

BACKGROUND OF THE INVENTION

The present invention concerns dynamically controlled electronic locking systems. It relates more particularly to a locking system of the type including means for entering data, an electromagnetic actuating device for actuating a bolt and an electronic circuit.

Such a locking system is, for example, disclosed in U.S. Pat. No. 5,488,660. The opening thereof is controlled by a combination, given by a central unit and modified each time that the locking system is opened. Since the locking system and the central unit are not directly connected to each other, they must be able to work in synchronism, so that the code transmitted by the central unit can be verified as being correct by the locking system.

These locking systems are particularly intended to allow a single access to a protected space, for example to the inside of a cash dispenser, to assure the maintenance and loading thereof. They assure, in particular, that persons entrusted with a maintenance operation on one occasion are prevented from using the code which was transmitted to them to subsequently open the locking system. Consequently, it is not possible to have access to the protected space without previously obtaining an access code from the central unit managing the system. Security of access is therefore considerably increased.

More precisely, the locking system disclosed in the aforementioned Patent includes a keyboard for entering the combinations into the locking system, a display for displaying the information relating to the entry of data, and an electronic circuit for receiving the combination and comparing it to an authorised combination. The electronic circuit includes:

- a device actuated when an entry combination is entered, to generate a combination from previously stored data;
- a comparator, for comparing the entry combination with the generated combination and, in the event of equality, for sending signals for the control of the bolt and storage of new data.

In this locking system, the combination is obtained from mathematical operations which involve, inter alia:

- the last accepted combination,
- a parameter peculiar to the locking system,
- a master combination, and
- a value which varies according to a predetermined rule, for example, the number of openings.

The entry combination is defined by a computer of the central unit managing the system, which includes the same calculating means and stores in its memory the same data as the locking system. The combinations are calculated, both in the locking system and in the central unit, on the basis of numbers stored in the memory and by applying preestablished mathematical formulae. The locking system includes, in addition, comparing means for comparing the combination entered with the generated combination, the bolt being released if the combinations are equal.

▩ Combination ▩ means a number entered into the locking system to be compared to a number generated in the locking system, these two numbers having to be equal.

BRIEF SUMMARY OF THE INVENTION

By developing a different approach, in which the memory stored data are processed by means of logic functions, it is possible to achieve locking systems allowing security of access to be further improved.

The invention therefore includes means for entering data, an electromagnetic actuation device for controlling a bolt and an electronic circuit. It is characterised in that the electronic circuit includes:

- a first memory for storing a reference value,
- a second memory for storing a current value,
- a processing unit including a first register for applying a function to the reference value, a second register for processing the current value, a third register for processing an entry value, means for transferring the reference value and the current value from its memory into its respective register and conversely, and logic means for:
  - processing the reference value contained in the first register to define a new reference value replacing the former value in the first register,
  - combining the current value contained in the second register and the entry value contained in the third register, to define a new current value replacing the former one in the second register,
  - comparing the content of the first and second registers, and
  - solely in the event of a match, sending an instruction to the electromagnetic actuation device to control the bolt, replacing, in the first memory, the reference value contained therein by the new reference value contained in the first register and replacing, in the second memory, the current value contained therein by the new current value contained in the second register.

Such a locking system requires a new access code upon each proper manipulation, which reduces the risk of unauthorised access, as mentioned hereinbefore, in a remarkably effective manner.

▩ Code ▩ means a number or a word entered into the locking system and processed by the electronic circuit to give a value which, compared to another value which is also defined by the circuit, allows or does not allow opening of the locking system.

In a particular embodiment, the processing unit includes shift registers, each including a plurality of cells, numbered 0 to n and in which the last data item to be entered occupies the cell of the lowest row.

More precisely, the processing unit includes, in addition, three exclusive OR gates, each provided with two inputs and one output and defining, with the shift registers, linear feed shift registers (LFSR).

More particularly, the processing unit includes:

- a value processing linear feed shift register, including a first shift register and an exclusive OR gate, for processing the former reference value in order to obtain a new reference value, and
- a combination linear feed shift register, including a second shift register, into which the current value is entered, and a third shift register, into which the entry value is entered, and two exclusive OR gates for combining the current value and the entry value and for defining the new current value.

The processing unit further includes a logic processing unit arranged to check whether the cells of the same row of at least a portion of the first and second shift registers, have an identical content.

It should be noted that the system forming the subject of the aforementioned Patent leads to combinations which are perfectly determined. In other words, by knowing the algorithm, which can be achieved easily by using a system of this type, and by analysing several successive combinations, it is possible to define the subsequent combinations. Certainly, access to the locking system is made more difficult when the code does not change, but it is still possible, with relatively modest means, to generate the subsequent opening combinations on the basis of data which is relatively easy to obtain and thus to obtain access in an unauthorised manner to the protected space.

One important object of the present invention is to overcome this drawback. The locking system is therefore also characterised in that the processing unit is arranged so that it only compares a portion of the elements of the current value and the reference value. More precisely, the logic processing unit only takes account of a portion of the cells of the first and second shift registers.

The present invention also concerns a control system including a central device arranged to generate different successive control codes and a dynamically controlled locking system.

This control system is characterised in that the central device includes:

- a first memory for storing a reference value, equal to the reference value contained in the first memory of the locking system,
- a second memory for storing a current value, equal to the current value contained in the second memory of the locking system,
- a processing unit including:
  - a first register for processing the reference value,
  - a second register for processing the current value,
  - means for transferring the reference value and the current value from its memory into its respective register and conversely,
  - means for processing the reference value contained in the first register, to define a new reference value replacing the value previously contained in the first register,
  - means for combining the current value contained in the second register and the new reference value, to define an entry value contained in a third register and a new current value contained in the second register.

In order to use the simplest possible means for the creation of the access codes, the control system is characterised in that the central device and the locking system include shift registers each including cells numbered from 0 to n, and in which the last data item to be entered occupies the cell of the lowest row.

In a particularly advantageous embodiment of the invention, the control system is characterised in that the locking system processing unit further includes three exclusive OR gates each provided with two inputs and one output, defining with said registers:

- a value processing linear feed shift register, including a first shift register into which the reference value is entered and an exclusive OR gate for processing the former reference value in order to obtain a new reference value, and
- a combination linear feed shift register, including a second shift register into which the current value is entered, and a third shift register into which the entry value is entered and two exclusive OR gates, for combining the current value and the entry value and for defining the new current value, and in that the processing unit of the device further includes three exclusive OR gates and a switch together defining:

- a value processing linear feed shift register, including a first shift register into which the reference value is entered, and an exclusive OR gate for processing the former reference value in order to obtain a new reference value, and
- a combination and mixing linear feed shift register, including a second shift register into which the current value is entered, a third shift register into which the entry value is entered, and a fourth shift register into which a value originating at least mediately from the first shift register is entered, and two exclusive OR gates, for processing the value contained in the fourth register and the former current value, in order to obtain the entry value and a new current value.

In order to assure the data processing, the locking system processing unit further includes a logic processing unit for checking whether the cells of the same row of at least a portion of the first and second register have an identical content.

As was explained hereinbefore, analysis of successive codes and knowledge of the algorithm generating them can allow the future codes to be defined. Once the locking system is arranged so that only a portion of the data contained in the code is read by the comparator, it is possible to enter random values, thereby making determination of future codes illusory. The control system is therefore characterised in that the logic processing unit of the locking system is arranged so that it only compares a portion of the elements of the current value and the reference value and in that the processing unit of the central device further includes a logic processing unit for processing the reference value contained in the first shift register and for entering the post-processing value into the fourth shift register, a fifth shift register and a sixth shift register cooperating with the logic processing unit to respectively mask a certain number of cells of the first register and to enter a random value into cells whose elements are not subject to comparison.

BRIEF DESCRIPTION OF THE DRAWINGS

Other advantages and features of the invention will appear from the following description, made with reference to the annexed drawing, in which.

DETAILED DESCRIPTION OF THE INVENTION

Figure 1:
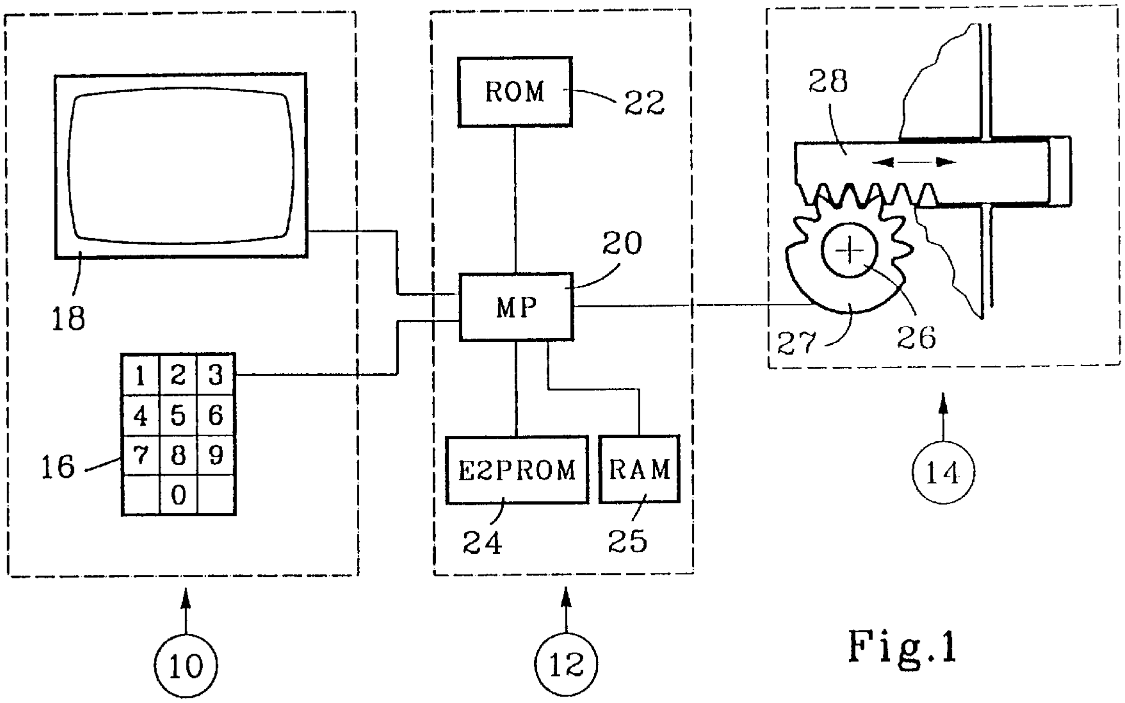
FIG. 1 shows a general diagram of a dynamically controlled locking system according to the invention.

The locking system as schematically shown in FIG. 1 includes means 10 for entering data into the locking system, an electronic data processing circuit 12 and a locking and unlocking control system 14.

Means 10 include a keyboard 16 and a screen 18 respectively allowing the user to enter and obtain data relating to the current operations.

Figure 2:
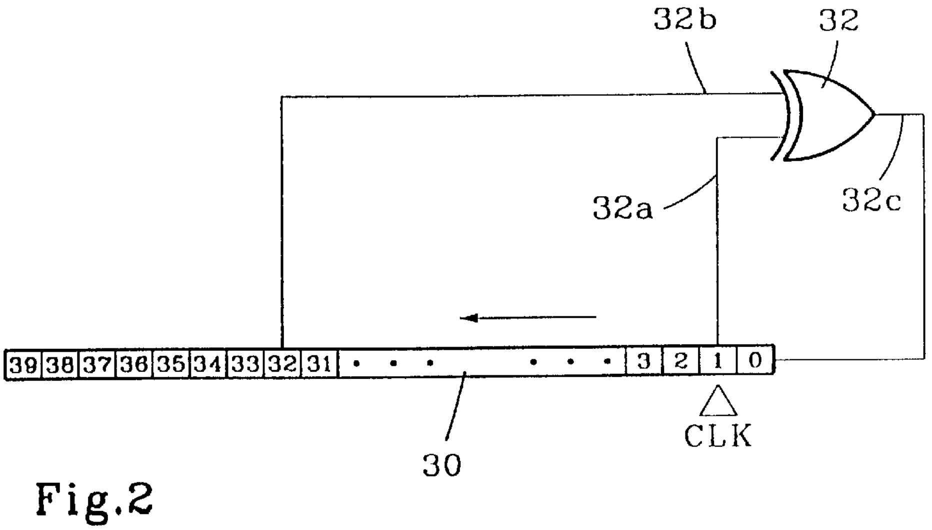
FIGS. 2 to 4 show respectively diagrams of value processing, value combination and combination and mixing linear feed shift registers.
Figure 3:
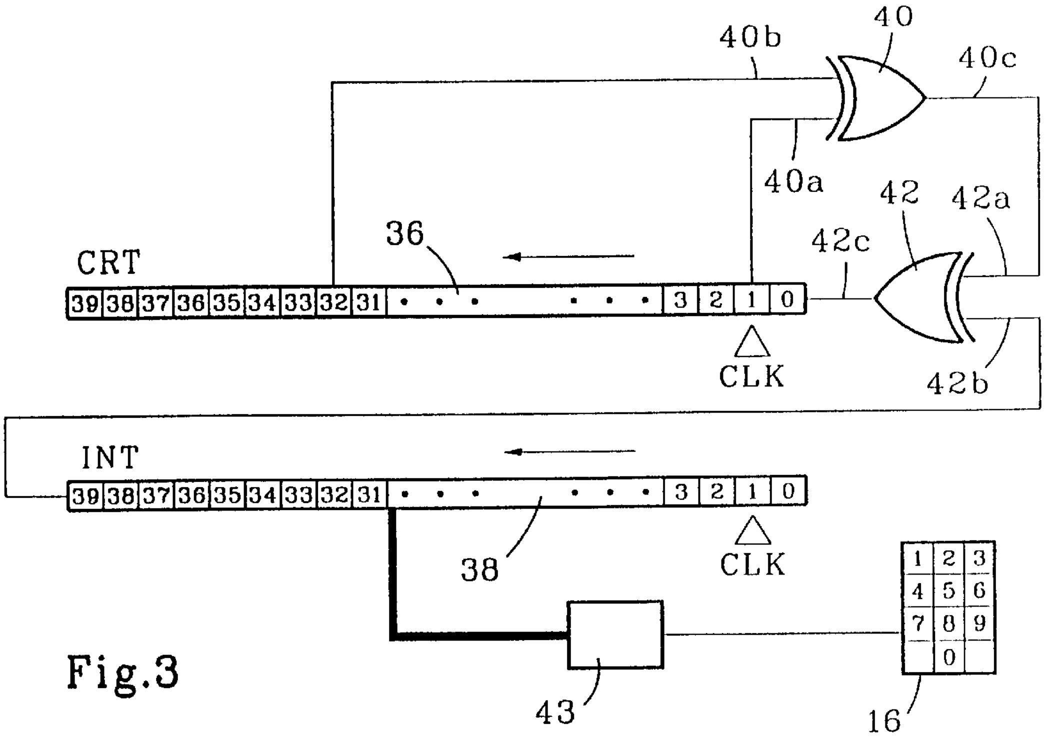
Figure 4:
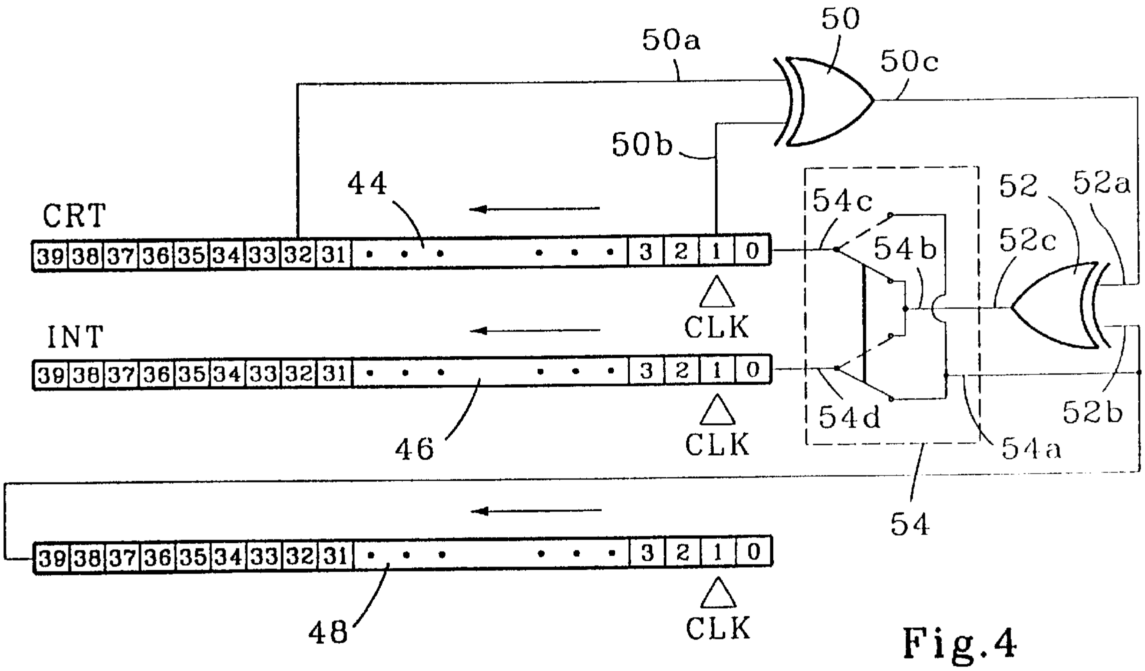

The electronic circuit includes a microprocessor 20, a ROM type memory 22, containing the control programmes, a set of re-programmable memories 24 of the $E^2$PROM type, allowing the successive values for the control of the opening of the bolt to be stored and a set of volatile memories 25 of the RAM type, in which registers, which will be described in more detail with reference to FIGS. 2, 3 and 4, are defined.

Control system 14 includes a motor 26 and a bolt 28, driven by a wheel 27 attached to the shaft of motor 26. It should be noted incidentally that the bolt could also be controlled by an electromagnet.

The locking system as described allows, for example, the opening of a cash dispenser to be controlled. When the person responsible for loading such machine is required to intervene, he asks the company which manages the cash dispenser for an access code. The code is defined by a central unit, which will be described in more detail with reference to FIG. 5*a*.

The code is entered by means of keyboard 16. Microprocessor 20 processes the values contained in re-programmable memories 24 corresponding to the last recognised code and the new code entered, to obtain a reference value REF, which depends solely upon the former reference values, and a current value CRT. If there is a match between REF and CRT, it allows the opening of bolt 28 and stores the new values obtained by combining the former values and the entered code.

If, conversely, there is no match, the bolt remains blocked and the content of memories 24 is not modified. After having finished the work which he had to do, the user informs the cash dispenser management company, which enters the data into the central unit.

In order to fully grasp the way in which the data processing function is assured, one needs to understand what a linear feed shift register (LFSR) is, such register being described for example in EDN ACCESS, Jan. 4, 1996, under the heading ▩ The Ouroboros of the digital consciousness: Linear feedback shift registers ▩. One of them is shown in FIG. 2. It includes, in this Figure, a shift register 30, including forty cells numbered from 0 to 39 and each containing an element of a stored binary value, and an exclusive OR gate 32, one of whose inputs, bearing the reference 32*a*, is connected to the cell of row 1 and the other 32*b* to the cell of row 32. Output 32*c* is connected to the input of shift register 30, i.e. to the cell of row 0.

According to the shift register principle, a new element is entered into the cell of row 0 at each clock signal CLK and the content of the cells is shifted by one row. In the linear feed shift register of FIG. 2, the value entered is defined by the content of the shift register itself. Each time that the register is moved forward by one step, the new value entered is defined by the values contained in the cells of row 1 and 32 which are respectively connected to inputs 32*a* and 32*b* of gate 32.

When the contents of these cells are equal (0-0 or 1-1), the output signal of gate 32 equals 0. If, conversely, the contents are different (0-1 or 1-0), the output signal is equal to 1. One can thus generate, in a simple manner, a succession of binary numbers having a quasi random nature, and yet evolving in a predictable manner. The period of repetition depends on the cells to which inputs 32*a* and 32*b* of gate 32 are connected. With the solution described hereinbefore, this period represents several billion rotations.

FIG. 3 shows a value combination linear feed shift register, intended to define a new current value CRT, from the former current value and an entry value INT whose features will be specified hereinafter. It includes two shift registers 36 and 38 and two exclusive OR gates 40 and 42, each having two inputs defined by the letters a and b and one output defined by the letter c. The access code, in decimal code, is entered into the locking system by means of keyboard 16. An electronic circuit 43 converts it into binary code, defining an entry value INT, entered into register 38 by parallel loading.

The two shift registers 36 and 38 each include forty cells, numbered 0 to 39. Inputs 40*a* and 40*b* of gate 40 are respectively connected to the cells of rows 1 and 32 of register 36. Inputs 42*a* and 42*b* of gate 42 are respectively connected to output 40c of gate 40 and to the cell of row 39 of register 38.

Register 36 thus initially contains the value CRT originating from the previous transaction and register 38 contains newly entered value INT. Since the cell of row 39 of register 38 is connected to input 42*b* of gate 42, whereas the other input 42*a* is connected to output 40*c* of gate 40, the logic states of these two inputs define a binary information item entered into the cell of row 0 of register 36. Consequently, each time that a clock signal is applied to register 38, the content thereof is shifted by one row and a bit is entered into register 36, depending upon its own content and that of register 38.

A value combination linear feed shift register allows a predictable value to be obtained, from two known values. It is however extremely difficult to determine such value if one is not familiar with the structure of shift registers.

In order to further improve access security, it is possible to introduce random parameters into the entry value and only to compare the predictable parameter portion. For this purpose, a structure such as that shown in FIG. 4 is used, FIG. 4 showing three shift registers respectively bearing the references 44, 46 and 48, two exclusive OR gates 50 and 52 and a switch with two inputs and two outputs, schematically shown at 54. The assembly forms a combination and mixing linear feed shift register. It allows a portion of the data contained in the cells of register 48 to be entered into registers 44 and 46, such portions being complementary, the other cells being loaded with data obtained by combining the data initially contained in registers 44 and 48.

More precisely, it allows entry value INT including data allowing the control of the bolt to be assured, to be obtained in register 46. For this purpose, gate 50 includes two inputs 50*a* and 50*b* respectively connected to the cells of rows 32 and 1 of register 44. Gate 52 includes inputs 52*a* and 52*b* respectively connected to output 50*c* of gate 50 and to the cell of row 39 of register 48. Switch 54 includes two inputs 54*a* and 54*b* and two outputs 54*c* and 54*d*. The cell of row 39 of register 48 is also connected to the first input 54*a* of switch 54. The second input 54*b* is connected to output 52*c* of gate 52. Finally, outputs 54*c* and 54*d* are respectively connected to the cells of row 0 of registers 44 and 46.

When switch 54 is in the position shown in the drawing, i.e. input 54*a* is connected to output 54*d*, the data contained in register 48 are transferred without modification into register 46. In other words, they are transferred without encrypting. This position corresponds to the transfer of random elements of entry value INT. In register 44 however, the data entered are obtained by processing of the content of register 44 and the content of register 48 by the exclusive OR function applied by gate 52. The situation is reversed when the switch changes. Consequently, the content of register 48 is transferred in clear into register 44 whereas register 46 receives a data item obtained by processing of the content of registers 44 and 48, by means of gate 52.

The content of register 46 is then converted into decimal code by means not shown in the drawing, the number obtained taking the place of an access code.

Figure 5A:
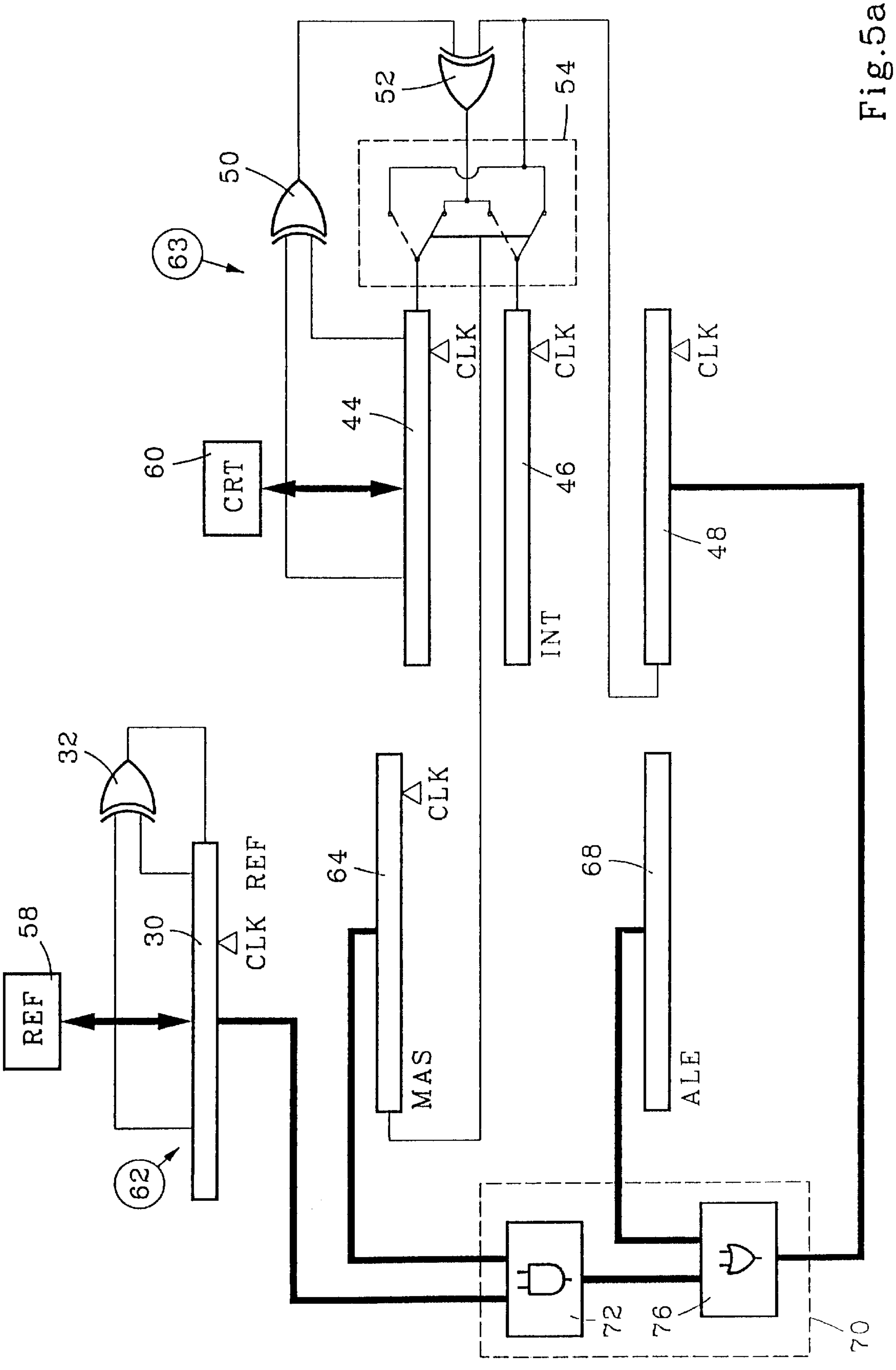
FIGS. 5*a* and 5*b* show respectively the schematic structure of the central unit and the locking system of the system according to the invention.
Figure 5B:
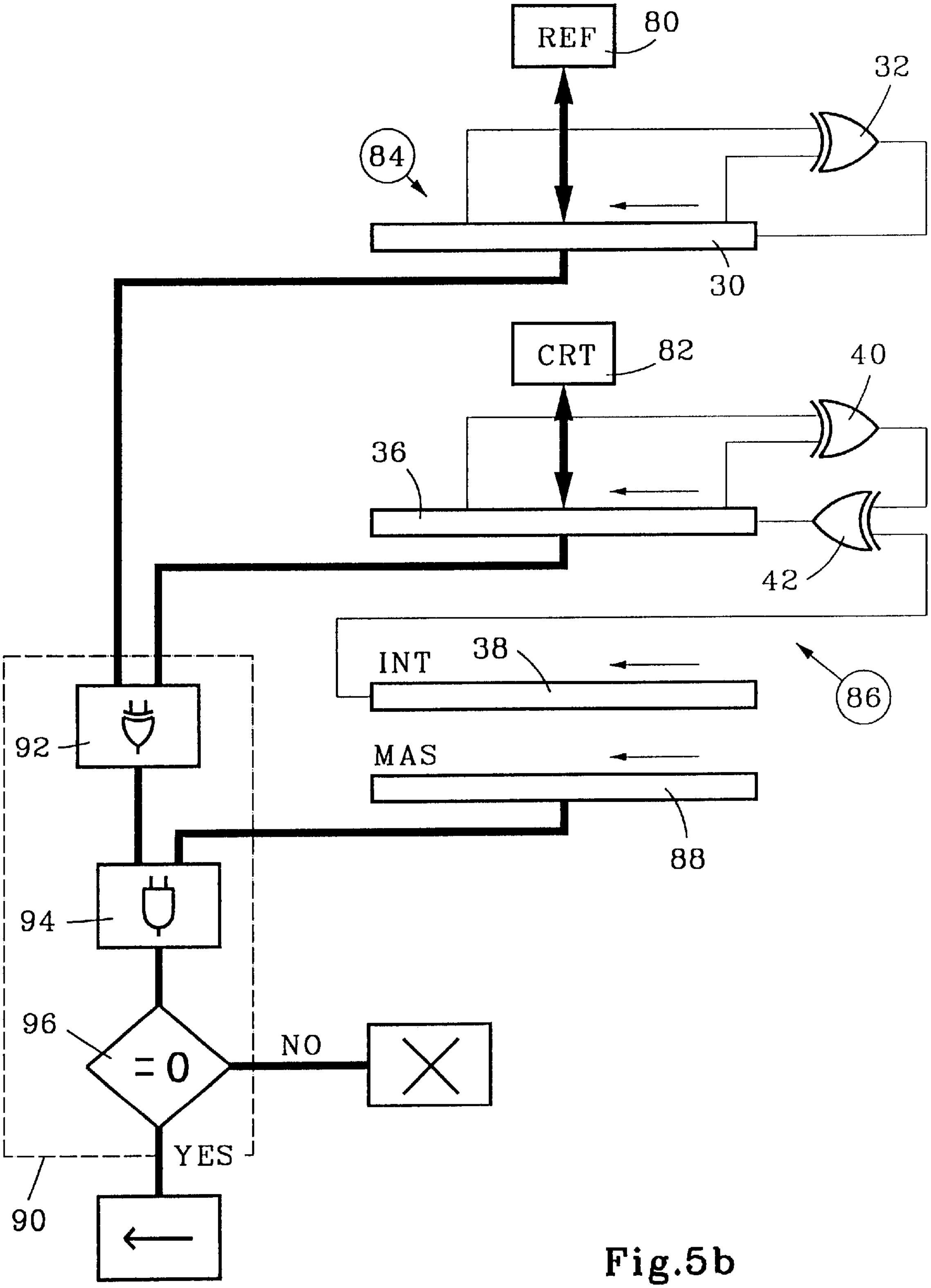

FIG. 5*a* shows schematically the device of the central unit intended to define the successive access codes of a dynamically controlled locking system, whose logic device is shown in FIG. 5*b*.

The device of the central unit includes two re-programmable memories 58 and 60, a value processing linear feed shift register 62, such as that defined with reference to FIG. 2 and a combination and mixing linear feed shift register 63 such as that defined with reference to FIG. 4. The constitutive parts of these registers bear the same references as those used in these Figures. It further includes two shift registers 64 and 68, and a logic processing unit 70 including means schematically shown at 72 and 76, and intended to assure respectively an AND logic function and an OR logic function.

Memories 58 and 60 contain respectively values REF and CRT whose features will be specified hereinafter.

Registers 64 and 68 include the same number of cells. Register 64 contains a constant value MAS, defining the cells whose content is encrypted, identified by 1, whereas the cells whose content is in clear contain a Register 68 is intended to receive a random value ALE. This value is obtained from a random binary number, which includes as many figures as there are cells in the registers, and which is generated by the central unit, by means known to those skilled in the art and not shown in the drawing, and processed by comparison with the content of register 64 so that for all the cells of register 64 containing a 1, the cell of the same row of register 68 is changed to 0. Consequently, the cells occupied by the variable elements of value ALE correspond to the cells of register 64 whose content is equal to 0. The other cells contain the value 0.

When the central unit device receives a code request, the content of memories 58 and 60 are respectively entered, by parallel loading, into register 30 of value processing linear feed shift register 62, and register 44 of combination and mixing linear feed shift register 63. A clock signal CLK REF is applied to register 30, to define a new value REF.

After which, the contents of registers 30, 64 and 68 are then processed in parallel, by means of logic processing unit 70. More precisely, the contents of registers 30 and 64 are processed by means of the AND function shown at 72. The value thereby obtained is equal to the content of register 30 when the content of register 64 is equal to 1, and to 0 in the other cases. Cells are thus emptied to allow a random portion ALE to be entered by means of the OR function, so that the value obtained at the output of unit 70 is formed of two portions including respectively, a random portion and a reference data item. The value thereby obtained is entered in parallel into register 48 whose content is then processed by register 63.

A clock signal CLK is then applied to registers 44, 46, 48 and 64. The data contained in register 64 controls switch 54 so that the signals originating from register 48 are directly entered into register 46 when the content of the corresponding cell of register 64 is equal to 0 and into register 44 when it equal to 1. At the end of this operation, register 46 contains the value, called INT, including a random portion and a portion intended to control the opening of the locking system. Value INT is then converted into decimal code, by means which are not shown, to make reading and processing thereof easier. The code is thus transmitted to the person who has to open the locking system.

It should be noted that all the components necessary to assure the functions of the central unit device are found in any personal computer and that the programming of the functions required to be assured is within the competence of those skilled in the art.

The access code, thereby obtained, is processed, after being entered by means of the keyboard and conversion into a binary value, by the logic device of the locking system as shown in FIG. 5*b*. This device includes, for this purpose, two re-programmable memories 80 and 82, a value processing linear feed shift register 84, such as that defined with reference to FIG. 2 and a value combination linear feed shift register 86, such as that defined with reference to FIG. 3. The constitutive parts of these registers bear the same references as those used in such Figures. This device further includes a shift register 88, and a logic processing unit 90 including means schematically shown in 92, 94 and 96 and intended to assure respectively exclusive OR, AND and IF functions.

Memories 80 and 82 contain respectively values REF and CRT, equal to the values contained in the central unit. For this to be so, it is sufficient if, at the beginning, equal values are entered into the corresponding memories of the locking system and the central unit. These values are then automatically adjust themselves.

Register 88 contains a constant value MAS equal to the value contained in register 64.

In order to assure opening of the locking system, the starting of the system causes the respective transfer of the content of memories 80 and 82 into registers 30 and 36. As shown in FIG. 3, the decimal access code is converted into binary code and gives value INT entered in parallel into register 38. The content of this register is then processed by value combination linear feed shift register 86. Simultaneously, the content of register 30 is processed as explained with reference to FIG. 2.

The elements of the cells of the same row of registers 30, 36 and 88 are then processed in parallel by means of logic unit 90. Each time that the elements of the same row of registers 30 and 36 are equal, the resulting element originating from the exclusive OR function is equal to 0, whereas if they differ, it is equal to 1. By processing the resulting elements with the elements of the same row of value MAS contained in register 88, by means of AND function 94, the variable elements of value ALE are always equal to 0. In other words, if all the encrypted elements of the same row of registers 30 and 36 are equal, the signal originating from the AND gate is always equal to 0. If this is the case, the IF function answers YES and the bolt is opened or released. If, on the contrary, one, at least, of the encrypted elements differs, the IF function answers NO and the bolt remains blocked.

When the value entered is refused, the content of the memories is not modified. If the value entered is accepted, the contents of registers 30 and 36 are respectively transferred into memories 80 and 82, as new reference and current values REF and CRT.

The person having asked for the code informs the central unit which transfers into memories 58 and 60 the respective contents of registers 30 and 44, as new reference and current values REF and CRT, in the device as described with reference to FIG. 5*a*.

It should be noted that in the system as described here, the decimal code given to the person having to open the locking system is defined by the combination of elements obtained from the processing of stored values REF and CRT and random elements. Consequently, it is impossible, on the basis of the code thus given, to determine accurately what the value of the next code to be entered will be. Moreover, even knowing the rows occupied by the cells containing elements relating to the random portion, it is impossible to define a future code without knowing both the content of values REF and CRT and the structure of the linear feed shift registers.

Because of this particular approach, the means implemented in the central unit differ from those associated with the locking system and knowledge of this latter does not allow a programme capable of generating future codes to be made. Consequently, access security is considerably improved.

It is of course understood that the concept defined hereinbefore can include numerous variants. The dynamically controlled system can be associated with a conventional constant code system.

Such locking systems frequently include a double command, with an electronic key and an access code. The masked portion of entry value INT could be enlarged, so as to introduce into the code an indication relating to the key which must be used jointly therewith. Such a solution further increases access security.

It should be noted that with the system according to the invention, disclosing the whole of the algorithm used does not in any way reduce the level of security of the locking system, which is not this case of the locking system disclosed in U.S. Pat. No. 5,488,660.

I claim:

1. Dynamically controlled electronic locking system including means (10) for entering data, an electromagnetic actuation device (26) for controlling a bolt (28) and an electronic circuit (12), characterised in that said circuit includes:

a first memory (80) for storing a reference value (REF), a second memory (82) for storing a current value (CRT), a processing unit including a first register (30) for applying a function to the reference value (REF), a second register (36) for processing the current value (CRT), a third register (38) for processing an entry value (INT), means for transferring the reference value (REF) and the current value (CRT) from its memory into its respective register and conversely, and logic means (32, 40, 42, 90) for:

processing the reference value (REF) contained in the first register to define a new reference value replacing the former value (REF) in the first register (30), combining the current value (CRT) contained in the second register (36) and the entry value (INT) contained in the third register (38), to define a new current value contained in the second register (36), comparing the content of the first (30) and second (36) registers and, in the event of a match only, sending an instruction to the electromagnetic actuation device (26) to control the bolt (28), and replacing in the first memory (80) the reference value contained therein by the new reference value contained in the first register (30) and replacing in the second memory (82) the current value contained therein by the new current value contained in the second register (36).

2. Locking system according to claim 1, characterised in that said processing unit includes shift registers, each including cells numbered 0 to n, and in which the last data item to be entered occupies the cell of the lowest row.

3. Dynamically controlled locking system according to claim 2, characterised in that said processing unit further includes three exclusive OR gates (32, 40, 42) each provided with two inputs and one output, defining with said registers:

a value processing linear feed shift register (84), including a first shift register (30) and an exclusive OR gate (32) for processing the former reference value in order to obtain a new reference value, and a combination linear feed shift register (86), including a second shift register (36) into which the current value (CRT) is entered, and a third shift register (38) into which the entry value (INT) is entered and two exclusive OR gates (40, 42) for combining the current value and the entry value and for defining the new current value.

4. Locking system according to claim 3, characterised in that the processing unit further includes a logic processing unit (90) for checking whether the cells of the same row of at least a portion of the first and second shift registers (30, 36) have an identical content.

5. Locking system according to any of claims 1 to 3, characterised in that said processing unit is arranged so that it only compares a portion of the elements of the current value (CRT) and the reference value (REF).

6. Locking system according to claim 4, characterised in that the logic processing unit (90) compares only a portion of the cells of the first and second shift registers (30, 36).

7. Control system including a central control device and at least one locking system according to claim 1, characterised in that said device includes:

a first memory (58) for storing a reference value (REF), equal to the reference value contained in the first memory (80) of the locking system, a second memory (60) for storing a current value (CRT), equal to the current value contained in the second memory (82) of the locking system, a processing unit including:

a first register (30) for processing the reference value (REF), a second register (44) for processing the current value (CRT), means for transferring the reference value (REF) and the current value (CRT) from its memory into its respective register and conversely, means (62) for processing the reference value contained in the first register (30) to define a new reference value replacing the value previously contained in the first register, means (63) for combining the current value contained in the second register (44) and the new reference value, to define an entry value contained in a third register and a new current value contained in the second register.

8. Control system according to claim 7, characterised in that the processing unit and the locking system include shift registers (30, 36, 38, 44, 46, 48, 64, 66, 68, 88) each including cells numbered from 0 to n, and in which the last data item to be entered occupies the cell of the lowest row.

9. Control system according to claim 8, characterised in that the processing unit of the locking system further includes three exclusive OR gates (32, 40, 42) each provided with two inputs and one output, defining with said registers:

a value processing linear feed shift register (84), including a first shift register (30) into which the reference value (REF) is entered, and an exclusive OR gate (32) for processing the former reference value in order to obtain a new reference value, and a combination linear feed shift register (86), including a second shift register (36) into which the current value (CRT) is entered, and a third shift register (38) into which the entry value (INT) is entered, and two exclusive OR gates (40, 42), for combining the current value and the entry value and for defining a new current value, and in that the processing unit of said device further includes three exclusive OR gates (32, 50, 52) and a switch (54) together defining:

a value processing linear feed shift register (62), including a first shift register (30) into which the reference value (REF) is entered, and an exclusive OR gate (32) for processing the former reference value in order to obtain a new reference value, and a combination and mixing linear feed shift register (63), including a second shift register (44) into which the current value (CRT) is entered, a third shift register (46) into which the entry value (INT) is entered, and a fourth shift register (48) into which a value originating at least mediately from the first shift register (30) is entered, and two exclusive OR gates (40, 42), for processing the value contained in the fourth register and the former current value, in order to obtain the entry value (INT) and a new current value (CRT).

10. System according to claim 9, characterised in that the processing unit of the locking system further includes a logic processing unit (90) for checking whether the cells of the same row of at least a portion of the first (30) and second (36) registers have an identical content.

11. System according to claim 10, characterised in that said logic processing unit (90) of the locking system is arranged so that it compares only a portion of the elements of the current value (CRT) and the reference value (REF) and in that the processing unit of said device further includes a logic processing unit (70) for processing the reference value (REF) contained in the first shift register (30) and for entering the post-processing value into said fourth shift register (48), a fifth (64) and a sixth (68) shift register co-operating with the logic processing unit (70) to respectively mask a certain number of cells of the first register (30) and to enter a random value (ALE) into the cells whose elements are not subject to said comparison.

* * * * *